(12) United States Patent
Bernardi et al.

(10) Patent No.: US 7,443,048 B2
(45) Date of Patent: Oct. 28, 2008

(54) METHOD FOR OPERATING AN ELECTRICAL SYSTEM

(75) Inventors: John Jay Bernardi, Chillicothe, IL (US); Brian Todd Morrical, Peoria, IL (US); Kevin Dee Ehrenhardt, Eureka, IL (US); Timothy Allen Goldammer, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 422 days.

(21) Appl. No.: 11/170,175

(22) Filed: Jun. 30, 2005

(65) Prior Publication Data

US 2007/0005205 A1    Jan. 4, 2007

(51) Int. Cl.
*B60L 1/00* (2006.01)

(52) U.S. Cl. .................. 307/9.1; 307/41; 700/295

(58) Field of Classification Search ............ 307/9.1, 307/10.1, 10.6, 38, 39, 41; 700/295, 296; 180/65.2, 65.8; 903/948; 318/98
See application file for complete search history.

(56) References Cited

U.S. PATENT DOCUMENTS

| | | | |
|---|---|---|---|
| 4,435,648 A | 3/1984 | Goode, III | |
| 4,617,472 A | 10/1986 | Slavik | |
| 4,639,609 A | 1/1987 | Floyd et al. | |
| 4,799,126 A | 1/1989 | Kruse et al. | |
| 5,081,586 A | 1/1992 | Barthel et al. | |
| 5,416,702 A * | 5/1995 | Kitagawa et al. | 307/10.1 |
| 5,449,956 A | 9/1995 | Williams | |
| 5,459,357 A | 10/1995 | Minks | |
| 5,525,843 A | 6/1996 | Höwing | |
| 5,691,576 A | 11/1997 | Minks | |
| 5,760,546 A | 6/1998 | Pabla et al. | |
| 5,986,355 A | 11/1999 | Rosén | |

(Continued)

FOREIGN PATENT DOCUMENTS

DE     103 47 684     5/2004

(Continued)

OTHER PUBLICATIONS

Chiu S. et al., "Knowledge-Based Qualitative Modelling and Adaptive Distribution of Power," Proceedings of the 25th Intersociety Energy Conversion Engineering Conference, Aug. 12, 1990, vol. 1, Conf. 25, pp. 353-357, XP000214665.

*Primary Examiner*—Michael J Sherry
*Assistant Examiner*—Andrew M Deschere
(74) *Attorney, Agent, or Firm*—Finnegan, Henderson, Farabow, Garrett & Dunner (57) ABSTRACT

A method for operating an electrical system for a machine is provided. The electrical system may include at least one power source connected to a power-distribution network. The power-distribution network may include a first portion with one or more power loads connected thereto and a second portion with one or more power loads connected thereto. The method may include repeatedly executing a load-priority cycle including operating in a first load-priority mode and subsequently operating in a second load-priority mode, during a power deficit. Operating in the first load-priority mode may include supplying power to the first and second portions of the power-distribution network, with a priority on supplying power to the first portion. Operating in the second load-priority mode may include supplying power to the first and second portions of the power-distribution network, with a priority on supplying power to the second portion.

23 Claims, 5 Drawing Sheets

U.S. PATENT DOCUMENTS

| | | |
|---|---|---|
| 6,121,692 A | 9/2000 | Michaels et al. |
| 6,297,566 B1 | 10/2001 | Lahr et al. |
| 6,330,838 B1 | 12/2001 | Kalsi |
| 6,384,489 B1 | 5/2002 | Bluemel et al. |
| 6,580,180 B2 | 6/2003 | Tamai et al. |
| 6,624,529 B2 | 9/2003 | Obayashi |
| 6,630,747 B1 | 10/2003 | Kamada et al. |
| 6,700,386 B2 | 3/2004 | Egami |
| 6,738,701 B2 | 5/2004 | Wilson |
| 6,841,895 B1 | 1/2005 | Kelwaski |
| 6,879,895 B2 | 4/2005 | Capps et al. |
| 7,143,596 B2 * | 12/2006 | Yonekura et al. .............. 62/236 |
| 2002/0113441 A1 | 8/2002 | Obayashi |
| 2003/0105567 A1 | 6/2003 | Koenig et al. |
| 2003/0144779 A1 | 7/2003 | Obayashi et al. |
| 2004/0189091 A1 | 9/2004 | Algrain et al. |
| 2004/0189098 A1 | 9/2004 | Algrain et al. |
| 2004/0232769 A1 * | 11/2004 | Pickering ................... 307/10.1 |
| 2005/0067900 A1 | 3/2005 | Bailey |

FOREIGN PATENT DOCUMENTS

| | | |
|---|---|---|
| EP | 0985584 A1 | 3/2000 |

\* cited by examiner

METHOD FOR OPERATING AN ELECTRICAL SYSTEM

TECHNICAL FIELD

The present disclosure relates to electrical systems and, more particularly, to methods for operating electrical systems.

BACKGROUND

Vehicles often include electrical systems for facilitating operation of the vehicle and increasing the comfort of an operator of the vehicle. Such electrical systems may include one or more power sources that produce electrical power, one or power-consuming devices, and power-distribution networks for distributing power from the power sources to the power-consuming devices. In some circumstances, the power-consuming devices may draw an undesirably high amount of power and it may be appropriate to limit the aggregate amount of power supplied to the power-consuming devices. Indiscriminately reducing the power supplied to the power-consuming devices may be problematic because it may cause failure of certain power-consuming devices that are critical to proper operation of driving systems of the vehicle. For example, excessively reducing the power supplied to an electrical controller of a prime mover of the vehicle may cause the controller and, thus, the prime mover to fail.

U.S. Patent Application No. 2003/0144779 ("the '779 application"), filed on Jan. 17, 2003, discloses a method for reducing the aggregate amount of power consumed by an electrical system of a vehicle without compromising performance of power-consuming devices critical to proper operation of driving systems of the vehicle. The '779 application discloses a vehicle electrical system with loads that are essential for driving of the vehicle and loads that are not essential for driving of the vehicle. The method disclosed by the '779 application includes monitoring the amount of power consumed by loads that are not essential for driving. The method further includes automatically discontinuing or reducing the supply of power to one or more of those loads not essential for driving if they consume an aggregate amount of power greater than a predetermined amount.

Although the control method of the '779 application economizes electrical power consumption without compromising operation of the driving systems of the vehicle, certain disadvantages persist. For example, limiting the power supplied to devices not required for driving to an arbitrary, predetermined amount may unnecessarily compromise performance of those devices. Additionally, when the vehicle is not being driven, the method may fail to capitalize on the opportunity to reduce the power supplied to power-consuming devices only necessary for driving, while maintaining operator satisfaction by providing full power to other power-consuming devices.

The control methods of the present disclosure solve one or more of the problems set forth above.

SUMMARY OF THE INVENTION

One disclosed embodiment includes a method for operating an electrical system for a machine. The electrical system may include at least one power source connected to a power-distribution network. The power-distribution network may include a first portion with one or more power loads connected thereto and a second portion with one or more power loads connected thereto. The method may include repeatedly executing a load-priority cycle including operating in a first load-priority mode and subsequently operating in a second load-priority mode, during a power deficit. Operating in the first load-priority mode may include supplying power to the first and second portions of the power-distribution network, with a priority on supplying power to the first portion. Operating in the second load-priority mode may include supplying power to the first and second portions of the power-distribution network, with a priority on supplying power to the second portion.

Another embodiment relates to an electrical system for a machine. The electrical system may include a power-distribution network with a first portion and a second portion. The machine electrical system may also include one or more power sources connected to the first portion of the power-distribution network through a power converter and connected to the second portion of the power-distribution network through a connection other than the power converter. Additionally, the machine electrical system may include one or more power loads connected to the first portion of the power-distribution network and one or more power loads connected to the second portion of the power-distribution network. Furthermore, the machine electrical system may include power-supply controls. The power-supply controls may be configured to adjust an output voltage at which the power converter supplies power to the first portion of the power-distribution network dependent upon power demands of one or more of the power loads connected to the second portion of the power-distribution network.

A further embodiment relates to a machine that includes a driving system and an electrical system. The electrical system may include one or more power sources and a power-distribution network with a first portion connected to one or more of the power sources and a second portion connected to one or more of the power sources. Additionally, the electrical system may include one or more power loads connected to the first portion of the power-distribution network and one or more power loads connected to the second portion of the power-distribution network. Furthermore, the electrical system may include power-supply controls. The power-supply controls may be configured to operate in a first load-priority mode when the driving system is operating. Operating in the first load-priority mode may include supplying power to the first and second portions of the power-distribution network, with priority on supplying power to the second portion. Additionally, the power-supply controls may be configured to selectively operate in the first load-priority mode or a second load-priority mode, dependant upon conditions of operation of the machine, when the driving system is not operating. The second load-priority mode may include supplying power to the first and second portions of the power-distribution network, with priority on supplying power to the second portion.

DETAILED DESCRIPTION

Figure 1:
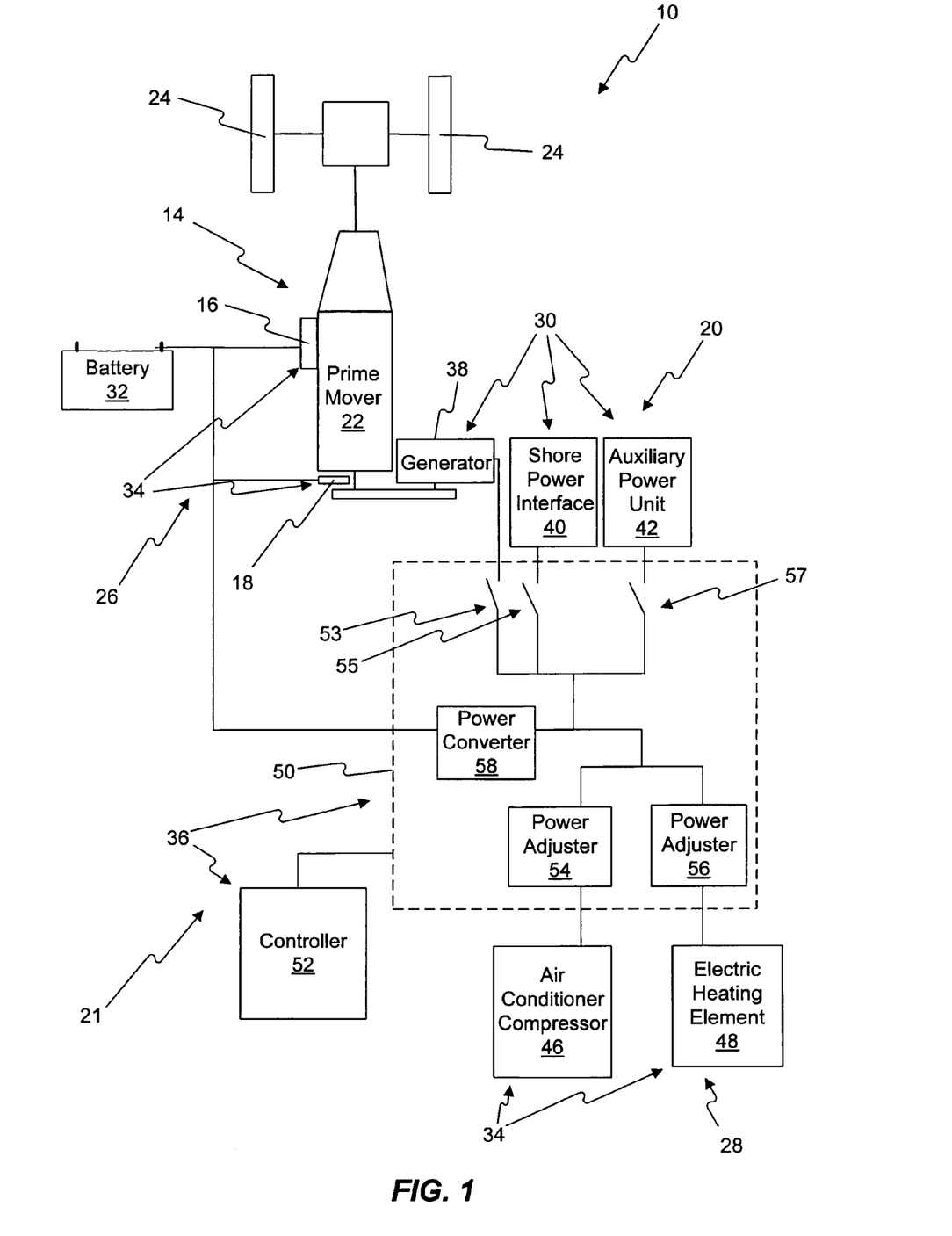
FIG. 1 is a schematic illustration of a machine according to one disclosed embodiment.

FIG. 1 provides a schematic view of a machine 10, which may be, for example, a work machine or a vehicle. Machine 10 may include one or more driving systems, such as a drive train 14, which may include one or more driving-system controllers, such as a drive-train controller 16, and one or more driving-system sensors, such as a shaft-position sensor 18. Drive-train controller 16, shaft-position sensor 18, and other driving-system controllers and/or driving-system sensors may also be part of an electrical system 20 of machine 10. While FIG. 1 shows machine 10 as a land-based, machine 10 may be a water vessel or an aircraft.

Each driving system of machine 10 may be configured to produce and/or control motion of machine 10. For example, drive train 14 may be configured to produce motion of machine 10. In addition to drive-train controller 16 and shaft position sensor 18, drive train 14 may include a prime mover 22, one or more propulsion devices 24, one or more other driving-system controllers (not shown), and/or one or more other driving-system sensors (not shown). Prime mover 22 may be any device configured to produce power for propelling machine 10, including, but not limited to, a diesel engine, a gasoline engine, a gaseous fuel driven engine, and a turbine engine. Propulsion devices 24 may be any type of device configured to receive power produced by prime mover 22 and propel machine 10, including, but not limited to, wheels, track units, and propellers. In addition to drive train 14, machine 10 may include other driving systems, such as a steering system (not shown) for controlling the path of motion of machine 10 and a braking system (not shown) for slowing machine 10. Such other driving systems may include driving-system controllers and driving-system sensors other than those of drive train 14 and/or such other driving systems may share driving-system controllers and driving-system sensors with drive train 14.

Electrical system 20 may include a power-distribution network 21 with a first portion 26 and a second portion 28, one or more power sources 30 connected to both first and second portions 26, 28 of power-distribution network 21, one or more power loads 34, and power-supply controls 36. First and second portions 26, 28 of power-distribution network 21 may be configured to receive electrical power from power sources 30 and distribute that power to power loads 34. First and second portion 26, 28 of power-distribution network 21 may include various electrical conductors, such as wires and switches. In addition to being commonly connected to power sources 30, first and second portions 26, 28 of power-distribution network 21 may be connected to a common ground (not shown), through power loads 34. Otherwise, first and second portions 26, 28 of power-distribution network 21 may be electrically isolated from one another.

Power sources 30 may include any type of device configured to produce electrical power. For example, as is shown in FIG. 1, power sources 30 may include a prime-mover-driven motor/generator 38, a shore power interface 40, and an auxiliary power unit 42. Shore power interface 40 may include one or more power receptacles for connecting to sources of power, including utility power (e.g. electric grid), an external generator, an external battery, power connections supplied by third parties (e.g. campgrounds, truck stops, rest areas, etc.), or any other external source of power. Shore power interface 40 may include receptacles configured to receive 110 volt ac power, 220 volt ac power, and/or dc power. Auxiliary power unit 42 may include an engine (not shown) mounted to machine 10, such as a diesel engine, a gasoline engine, a gaseous fuel driven engine, or a turbine engine, and a motor/generator (not shown) connected to the engine.

Power loads 34 may include drive-train controller 16, shaft-position sensor 18, and one or more other driving-system controllers and driving-system sensors connected to first portion 26 of power-distribution network 21. Additionally, power loads 34 connected to first portion 26 of power-distribution network 21 may include a battery 32 and various electrical accessories, such as lights (not shown), a radio (not shown), and power windows (not shown). Power loads 34 connected to second portion of power-distribution network 21 may include components of climate-conditioning units, such as an air conditioner compressor 46 and an electric heating element 48.

Power-supply controls 36 may be configured to control which power sources 30 are connected to first and second portions 26, 28 of power-distribution network 21. Additionally, power-supply controls 36 may be configured to control the quantity of power supplied from power sources 30 to each of first portion 26 and second portion 28 of power-distribution network 21. Power-supply controls 36 may include a power electronics module 50 and a controller 52.

Power electronics module 50 may include one or more switching devices 53, 55, 57, one or more power adjusters 54, 56, and a power converter 58. Switching devices 53, 55, and 57 may be configured to selectively connect prime-mover-driven generator 38, shore power interface 40, and auxiliary power unit 42, respectively, to power adjusters 54, 56 and power converter 58. Each power adjuster 54, 56 and power converter 58 may be configured to adjust the amount of electrical power supplied to part or all of first portion 26 and/or part or all of second portion 28 of power-distribution network 21. Power adjuster 54 may be configured to adjust the amount of power supplied to air conditioner compressor 46. Power adjuster 56 may be configured to adjust the amount of power supplied to electric heating element 48.

Power converter 58 may be configured to receive electrical power in one form and output electrical power in another form. For example, power converter 58 may be a down converter, configured to receive electrical power at a first voltage and output electrical power at a second voltage, lower than the first voltage. Power converter 58 may be configured such that electricity can only flow from power converter 58 to first portion 26 of power-distribution network 21, regardless of whether the output voltage of power converter 58 is lower than the voltage in first portion 26 of power-distribution network 21.

Controller 52 may be configured to receive inputs relating to conditions of operation of electrical system 20 and machine 10 and control which power sources 30 connect with power electronics module 50. Controller 52 may further be configured to control the power that power electronics module 50 supplies to first and second portions 26 and 28 of power-distribution network 21, respectively. Controller 52 may include one or more processors (not shown) and one or more memory devices (not shown). Controller 52 may be a dedicated controller for controlling power electronics module 50. Alternatively, controller 52 may be configured to control other components of electrical system 20 and/or other components of machine 10.

Electrical system 20 is not limited to the configuration shown in FIG. 1. For example, electrical system 20 may omit one or more of prime-mover-driven motor/generator 38, shore power interface 40, and auxiliary power unit 42. Electrical system may also include other power sources, in addition to those shown in FIG. 1. Additionally, electrical system 20 may omit one or more of power adjusters 54, 56 and/or include other power adjusters in addition to those. Furthermore electrical system 20 may include another type of power adjuster in place of power converter 58. Moreover, one or more of switching devices 53, 55, 57 may be omitted, and one or more of power sources 30 may be continuously connected to power-distribution network 21. Additionally, the components making up power electronics module 50 in the embodiment of FIG. 1 may be physically dispersed, rather than located together.

INDUSTRIAL APPLICABILITY

The disclosed embodiments have application in any machine 10 having electrical power loads 34. The operation of an electrical system 20 of a machine 10 according to the disclosed embodiments is described below.

One or more of power sources 30 may provide electrical power to power adjusters 54, 56 and power converter 58. For example, when prime mover 22 is operating and switching device 53 is closed, prime-mover-driven motor/generator 38 may supply power to power adjusters 54, 56 and power converter 58. Similarly, shore power interface 40 and auxiliary power unit 42 may supply power to power adjusters 54, 56 and power converter 58 when switching devices 55 and 57, respectively, are closed. In some embodiments, controller 52 may cause power electronics module 50 to connect to and receive power from prime-mover-driven motor/generator 38 whenever prime mover 22 is operating.

Under the control of controller 52, power adjuster 54, power adjusters 56, and power converter 58 may receive power from whichever of power sources 30 are connected to power electronics module 52 and supply power to air conditioner compressor 46, electric heating element 48, and first power-distribution network 26, respectively. Controller 52 and power electronics module 50 may cause power adjuster 54 and power adjusters 56 to supply power to air conditioner compressor 46 and electric heating element 48 at a constant voltage, such as 340 volts dc. Controller 52 and power electronics module 50 may cause power converter 58 to receive power at a first voltage, such as 340 volts dc and supply power to first portion 26 of power-distribution network 21 at an adjustable output voltage, such as 9-16 volts dc. When power sources 30 are supplying enough power to meet the power demands of all power loads 34, power adjuster 54 and power adjusters 56 may supply however much power that air conditioner compressor 46 and electric heating element 48 are demanding. Additionally, in such circumstances, power converter 58 may supply power to first portion 26 of power-distribution network 21 at a substantially constant voltage, such as 14.2 volts dc.

In some embodiments, power-supply controls 36 may exercise direct, automatic control over the amount of power supplied to one or more of power loads 34 connected to first and second portions 26, 28 of power-distribution network 21. For example, in the embodiment illustrated in FIG. 1, because air conditioner compressor 46 is the only power load 34 connected to power adjuster 54, power-supply controls 36 can directly and automatically control the amount of power supplied to air conditioner compressor 46. By contrast, because drive-train controller 16, shaft-position sensor 18, and battery 32 are all connected to power converter 58, power-supply controls 36 cannot directly control the amount of power supplied to each, only the aggregate amount of power supplied to all.

During operation of electrical system 20, a power deficit may arise wherein power loads 34 of electrical system 20 are demanding more power than power sources 30 are supplying. In such circumstances, power-supply controls 36 must compromise the amount of power supplied to one or more of power loads 34. Power-supply controls 36 may respond to a power deficit by supplying power to both first portion 26 and second portion 28 of power-distribution network 21 with a priority on supplying power to first portion 26 or a priority on supplying power to second portion 28. If priority is on supplying power to first portion 26 of power-distribution network 21, power-supply controls 36 may compromise the amount of power supplied to second portion 28 sooner and/or to a greater degree than the amount of power supplied to first portion 26. Similarly, if priority is on supplying power to second portion 28 of power-distribution network 21, power-supply controls 36 may compromise the amount of power supplied to first portion 26 sooner and/or to a greater degree than the amount of power supplied to second portion 28.

In some embodiments power-supply controls 36 may supply power to whichever of first portion 26 and second portion 28 of power-distribution network 21 has priority, independent of the power demands of power loads 34 connected to the other portion. For example, if priority is on supplying power to first portion 26, power-supply controls 36 may supply first portion 26 with all the power demanded by the power loads 34 connected thereto. To accomplish this, power supply controls 36 may compromise the amount of power supplied to the second power-distribution network 28 by an amount equivalent to any power deficit that exists.

In one such embodiment, controller 52 may cause power converter 58 to supply power to first portion 26 of power-distribution network 21 at a constant voltage, thereby fully meeting the power demands of power loads 34 connected thereto. For example, power converter 58 may supply power to first portion 26 of power-distribution network 21 at approximately 14.2 volts dc, which may help ensure proper operation of drive-train controller 16, shaft-position sensor 18, and other driving-system controllers (not shown) and sensors (not shown) connected to first portion 26.

Figure 2:
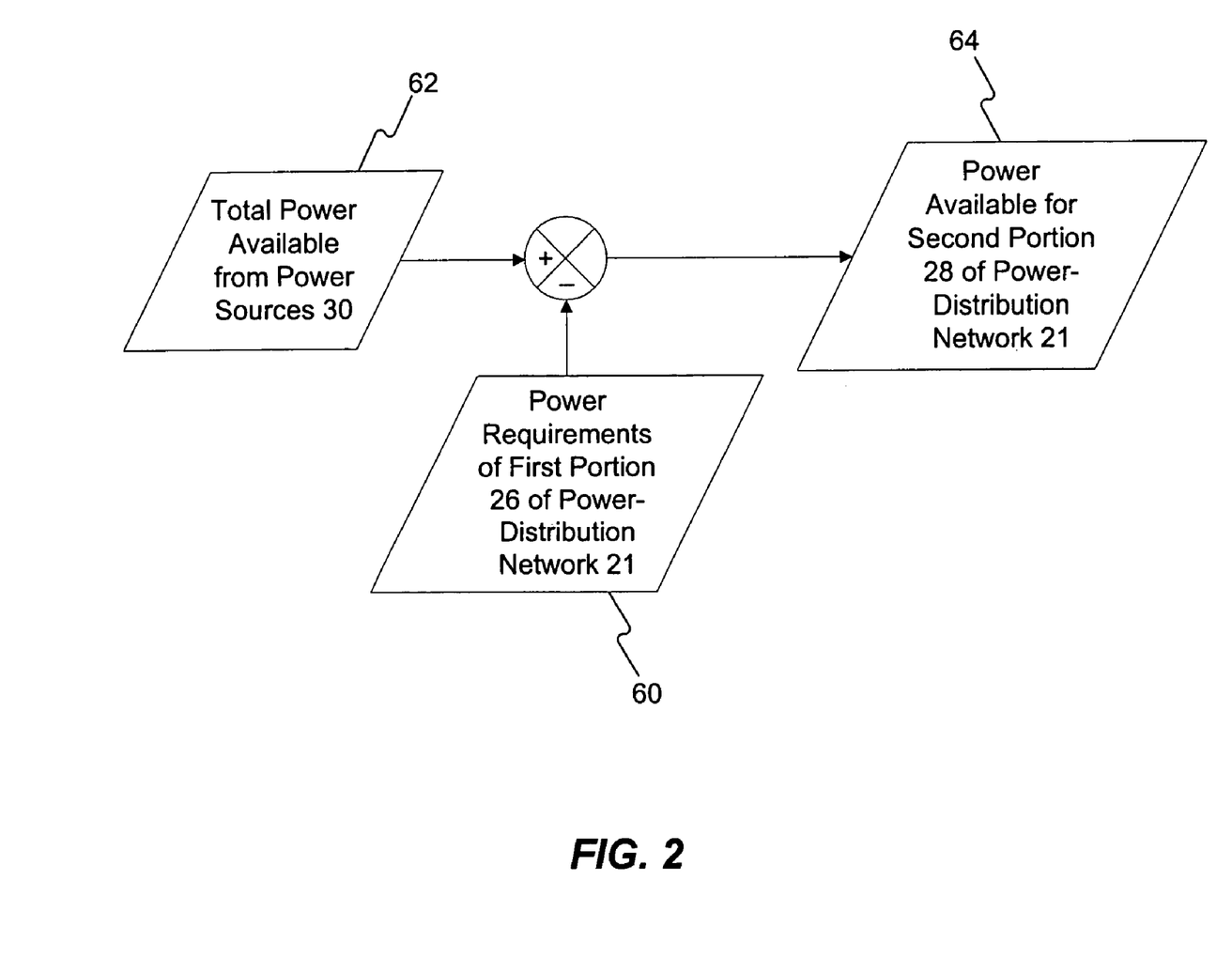
FIG. 2 is a diagram illustrating one mode of allotting power among portions of a power-distribution network.

As is illustrated in FIG. 2, power-supply controls 36 may supply whatever power is available, after meeting the needs of first portion 26 of power-distribution network 21, to second portion 28 of power-distribution network 21. Controller 52 may determine the total power available from power sources 30. To do so, controller 52 may determine which power sources 30 are supplying power, monitor operating conditions related to those power sources 30, and reference stored data of how much power those power sources 30 can produce under those operating conditions. Controller 52 may then subtract the amount of power required by first portion 26 of power-distribution network 21 (60) from the total power available 62 to determine the amount of power available for second portion 28 of power-distribution network 21 (64). Controller 52 may cause power adjusters 54, 56 to supply an aggregate amount of power equal to the amount of power available for the second portion 28 of power-distribution network 21. By continuously adjusting the amount of power supplied to air conditioner compressor 46 and electric heating element 48 dependant upon the amount of power available, power-supply controls 36 may avoid unnecessarily compromising operation of air conditioner compressor 46 and/or electric heating element 48.

Figure 3:
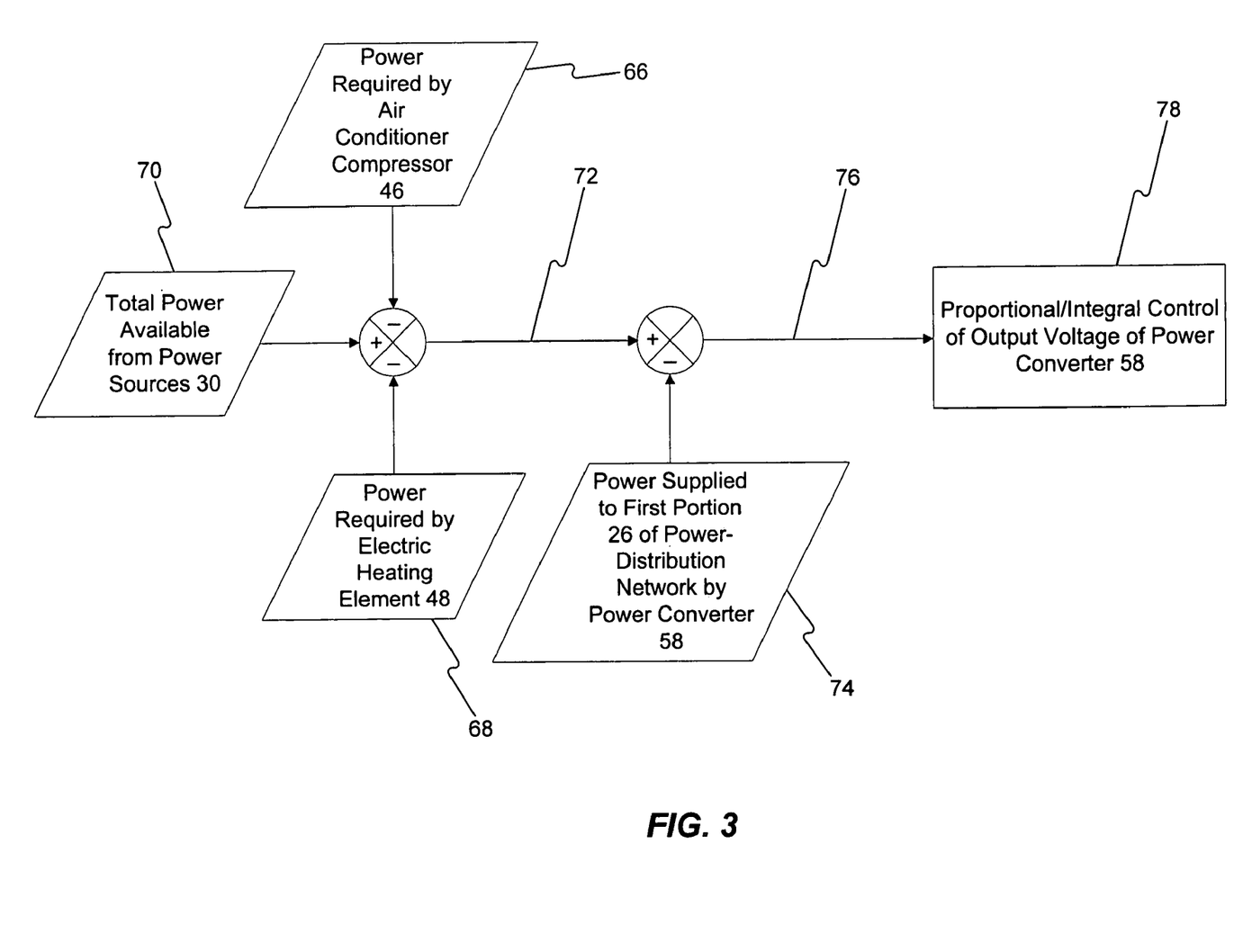
FIG. 3 is a diagram illustrating another mode of allotting power among portions of a power-distribution network.

When priority is on supplying power to second portion 28 of power-distribution network 21, controller 52 may cause power adjusters 54, 56 to supply however much power that air conditioner compressor 46 and electric heating element 48 demand. As is illustrated in FIG. 3, power-supply controls 36 may adjust the output voltage of power converter 58 to maintain the amount of power supplied to first portion 26 of power-distribution network 21 at or close to the remaining power available. Controller 52 may subtract the amount of power required 66 by air conditioner compressor 46 (66) and the amount of power required by electric heating element 48 (68) from the total amount of power available from power sources 30 (70), to determine the amount of power available for first portion 26 (72).

Power-supply controls 36 may adjust the output voltage of power converter 58 in order to maintain the amount of power supplied to first portion 26 of power-distribution network 21 substantially equal to the amount of power available for first portion 26 of power-distribution network 21. Controller 52 may determine an error in the amount of power supplied by power converter 58 (76) by determining the amount of power that power converter 58 is supplying to first power-distribution network 21 (74) and subtracting it from the amount of power available for first portion 26 of power-distribution network 21 (72). A negative error in the amount of power supplied by power converter 58 (76) would exist when power converter 58 is supplying more power than is available for first portion 26 of power-distribution network 21. This may occur after a sudden change in operating conditions that causes power supplied by power sources 30 to temporarily exceed the amount nominally available and/or power allotted for second portion 28 of power-distribution network 21 to divert to power converter 58. A positive error in the amount of power supplied by power converter 58 (76) would exist when the amount of power supplied by power converter 58 is less than the amount of power available for first portion 26 of power-distribution network 21.

Power-supply controls 36 may adjust the output voltage of power converter 58 dependant upon the error in the amount of power supplied by power converter 58 (76). If the error in the amount of power supplied by power converter 58 (76) is negative, power-supply controls 36 may decrease the output voltage of power converter 58, to decrease the amount of power supplied to first portion 26 of power-distribution network 21. Similarly, if the error in the amount of power supplied by power converter 58 (76) is positive, power-supply controls 36 may increase the output voltage of power converter 58. In some embodiments, power-supply controls 36 may perform proportional/integral control of the output voltage of power converter 58 (78), based on the error in power supplied by power converter 58 (76).

Figure 4A:
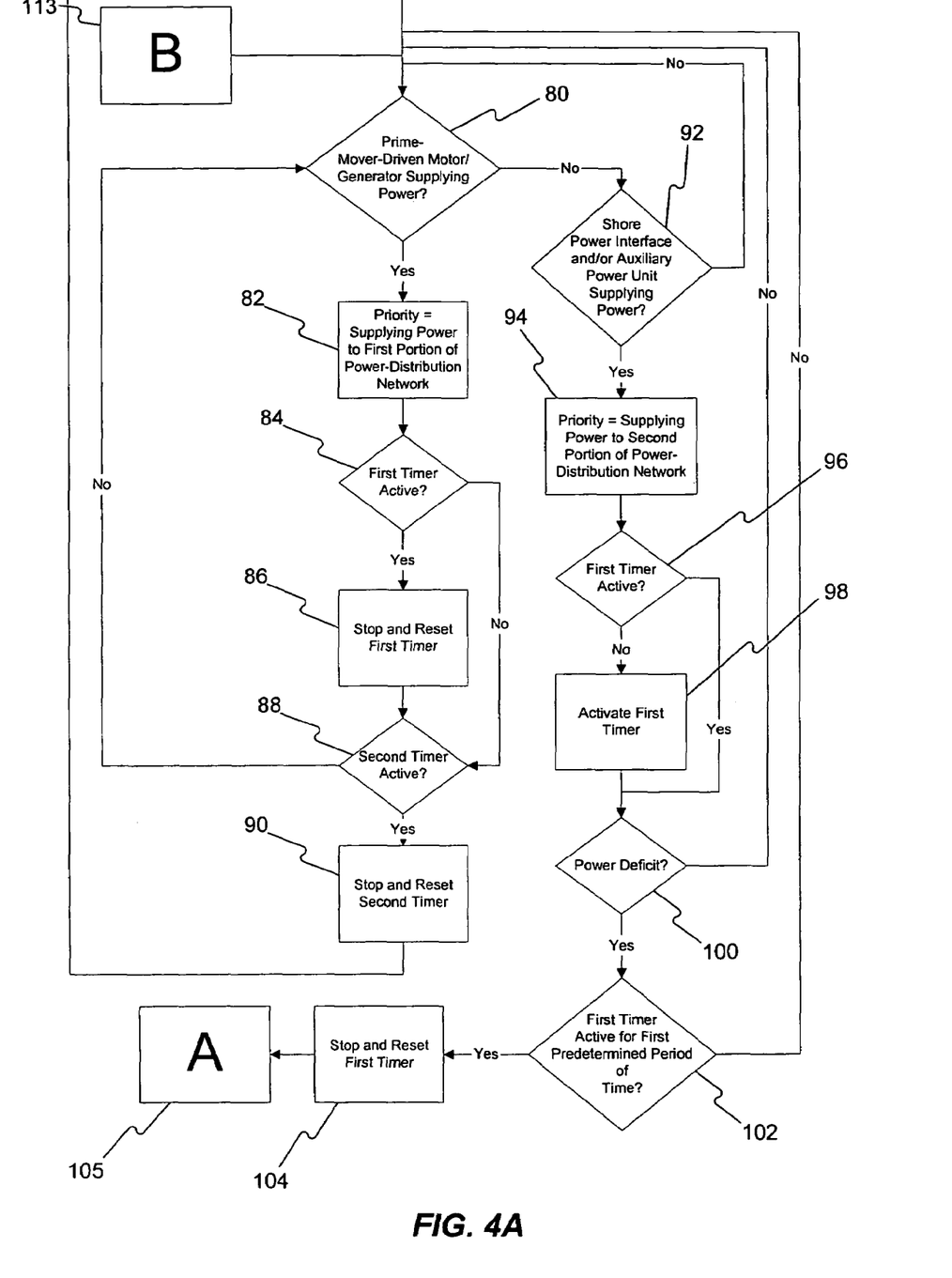
FIG. 4A is a first portion of a flow chart illustrating a method of prioritizing supply of power to different portions of a power-distribution network.
Figure 4B:
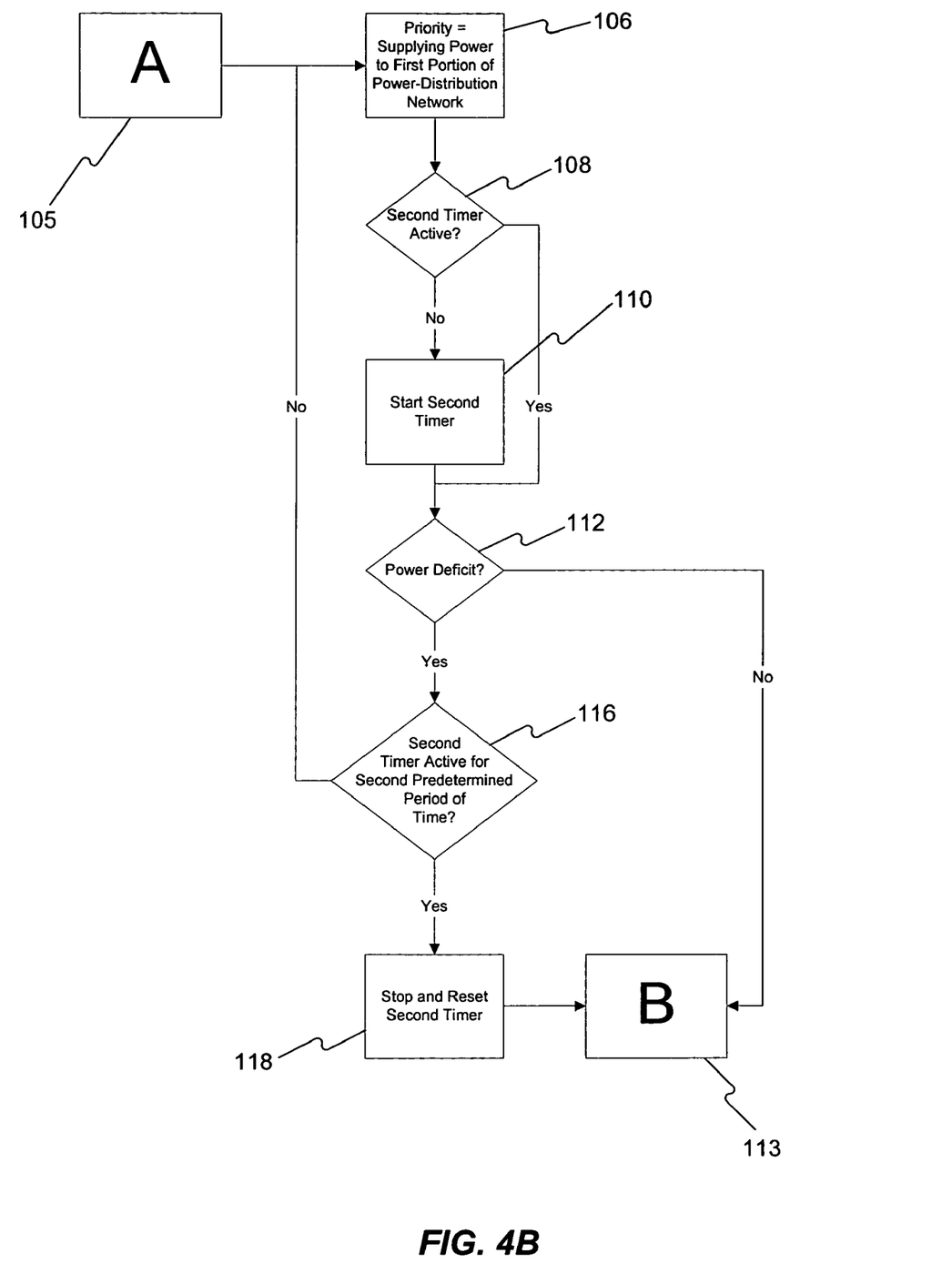
FIG. 4B is a second portion of the flow chart of FIG. 4A.

FIGS. 4A and 4B contain a flow chart illustrating one method according to which power-supply controls 36 may determine whether priority is on supplying power to first portion 26 or second portion 28 of power-distribution network 21. Controller 52 may determine whether prime-mover-driven motor/generator 38 is supplying power to power electronics module 50 (step 80). If so, controller 52 may determine that priority is on supplying power to first portion 26 of power-distribution network 21 (step 82). Controller 52 may then stop and reset any active timers (steps 84, 86, 88, and 90) and return to step 80. Thus, as long as prime-mover-driven motor/generator 38 is supplying power to power electronics module 50, priority may be on supplying power to first portion 26 of power-distribution network 21. Accordingly, in embodiments wherein prime-mover-driven motor/generator 38 supplies power whenever prime mover 22 is operating, priority may be on supplying power to first portion 26 of power-distribution network 21 whenever prime mover 22 is operating. This may help ensure that drive-train controller 16, shaft-position sensor 18, and other driving-system controllers and sensors of machine 10 receive adequate power to operate properly when drive train 14 is operating.

If prime-mover-driven motor/generator 38 is not supplying power to power electronics module 50, controller 52 may determine if shore power interface 40 or auxiliary power unit 42 is supplying power to power electronics module 50 (step 92). If so, controller 52 may determine that priority is on supplying power to second portion 28 of power-distribution network 21 (step 94). Controller 52 may then determine if a first timer is active (step 96) and, if not, activate the first timer (step 98). Controller 52 may then determine whether there is a power deficit (step 100). If not, controller 52 may return to step 80. Thus, as long as shore power interface 40 and/or auxiliary power unit 42, rather than prime-mover-driven motor/generator 38, are supplying power and there is no power deficit, priority may be on supplying power to second portion 28 of power-distribution network 21.

If controller 52 determines at step 100 that there is a power deficit, controller 52 may determine if first portion 26 of power-distribution network 21 has had priority for a first predetermined period of time by determining whether the first timer has been active for the first predetermined period of time, such as five minutes (step 102). If so, controller 52 may stop and reset the first timer (step 104). Controller 52 may then proceed to step 105 and, from there, to step 106 (shown on FIG. 4B), where it may shift priority to supplying power to second portion 28 of power-distribution network 21. Controller 52 may then determine if a second timer is active (step 108) and, if not, activate the second timer (step 110). Controller 52 may also determine again whether a power deficit persists (step 112) and, if not proceed to step 113 and, from there, return to step 80. If so, controller 52 may determine whether the second timer has been active for a second predetermined period of time, such as five minutes (step 116). If so, controller 52 may stop and reset the second timer (step 118), proceed to step 113 and, from there, return to step 80. From there controller 52 may shift priority back to supplying power to first portion 26 of power-distribution network 21 if shore power interface 40 and/or auxiliary power unit 42 is supplying power, rather than prime-mover-driven motor/generator 38.

Thus, as long as prime-mover-driven motor/generator 38 is not supplying power and a power deficit exists, priority may cycle between supplying power to first portion 26 for the first predetermined period of time and supplying power to second portion 28 for the second predetermined period of time. This may provide a desirable balance between supplying power to air conditioner compressor 46 or electric heating element 48 for keeping an operator of machine 10 comfortable and supplying power to battery 32 to maintain an acceptable charge level thereof.

It will be apparent to those of ordinary skill in the art that various modifications and variations can be implemented with electrical system 20 and the disclosed methods of operating it without departing from the scope of the disclosure. Other embodiments will be apparent to those skilled in the art from consideration of the specification and practice of the electrical system 20 and the disclosed methods of operating it. It is intended that the disclosure of these embodiments be considered as exemplary only, with a true scope of the invention being indicated by the following claims and their equivalents.

What is claimed is:

1. A method for operating an electrical system for a machine, which electrical system includes at least one power source connected to a power-distribution network including a first portion with one or more power loads connected thereto and a second portion with one or more power loads connected thereto, the method comprising:

during a power deficit, repeatedly executing a load-priority cycle, including:
    operating in a first load-priority mode, including supplying power to the first and second portions of the power-distribution network, with a priority on supplying power to the first portion of the power-distribution network; and
    subsequently, operating in a second load-priority mode, including supplying power to the first and second portions of the power-distribution network, with a priority on supplying power to the second portion of the power-distribution network.

2. The method of claim 1, wherein executing the load-priority cycle includes executing the load-priority cycle only if a driving system of the machine is not operating.

3. The method of claim 2, further including:
    when a prime-mover of the machine is operating, operating in the first load-priority mode continuously.

4. The method of claim 3, wherein supplying power to the first portion of the power-distribution network includes supplying power to at least one of a driving-system controller and a driving-system sensor.

5. The method of claim 4, wherein supplying power to the second portion of the power-distribution network includes supplying power to one or more components of climate-conditioning units of the machine.

6. The method of claim 3, wherein operating in the first load-priority mode includes supplying power to the first portion of the power-distribution network independent of the power demands of the power loads connected to the second portion of the power-distribution network, and supplying power to the second portion of the power-distribution network in a quantity dependent upon the power demands of the power loads connected to the first portion of the power-distribution network.

7. The method of claim 1, wherein executing the load-priority cycle includes repeatedly operating in the first load-priority mode for a predetermined period of time and subsequently operating in the second load-priority mode for a predetermined period of time.

8. The method of claim 1, wherein operating in the first load-priority mode includes supplying power to the first portion of the power-distribution network independent of the power demands of the power loads connected to the second portion of the power-distribution network, and supplying power to the second portion of the power-distribution network in a quantity dependent upon the power demands of the power loads connected to the first portion of the power-distribution network.

9. The method of claim 1, wherein executing the load-priority cycle includes supplying power from at least one of a shore power source and an auxiliary power unit to the first portion of the power-distribution network and the second portion of the power-distribution network.

10. An electrical system for a machine, comprising:
    a power-distribution network, including a first portion and a second portion;
    one or more power sources connected to the first portion of the power-distribution network through a power converter and connected to the second portion of the power-distribution network through a connection other than the power converter;
    one or more power loads connected to the first portion of the power-distribution network;
    one or more power loads connected to the second portion of the power-distribution network; and
    power-supply controls configured to execute a control method including:
        adjusting an output voltage at which the power converter supplies power to the first portion of the power-distribution network dependant upon power demands of one or more of the power loads connected to the second portion of the power-distribution network.

11. The electrical system of claim 10, wherein adjusting the output voltage of the power converter includes adjusting the output voltage of the power converter dependant upon an amount of power available from one or more of the power sources, in addition to the power demands of one or more of the power loads connected to the second portion of the power-distribution network.

12. The electrical system of claim 10, wherein adjusting the output voltage of the power converter includes adjusting the output voltage of the power converter dependent upon an amount of power available from one or more of the power sources and an amount of power that the power converter is supplying to the first portion of the power-distribution network, in addition to the power demands of one or more of the power loads connected to the second portion of the power-distribution network.

13. The electrical system of claim 10, wherein adjusting the output voltage of the power converter dependant upon the power demands of one or more of the power loads connected to the second portion of the power distribution network includes:
    subtracting an amount of power demanded by the power loads connected to the second portion of the power-distribution network from an amount of power available from the power sources, to determine an amount of power available for the first portion of the power-distribution network; and
    adjusting the output voltage of the power converter dependent upon the amount of power available for the first portion of the power-distribution network.

14. The electrical system of claim 10, wherein the power-supply controls are capable of direct, automatic control of the amount of power supplied to one or more of the power loads connected to the second portion of the power-distribution network, and the power-supply controls are incapable of direct, automatic control of the amount of power supplied to one or more of the power loads connected to the first portion of the power-distribution network.

15. The electrical system of claim 10, further including:
    a battery connected to the first portion of the power-distribution network through a connection other than the power converter;
    wherein the power loads connected to the first portion of the power-distribution network include at least one of a driving-system controller and a driving-system sensor; and
    wherein the power loads connected to the second portion of the power-distribution network include one or more components of climate-conditioning units.

16. A machine, comprising:
    a driving system;
    an electrical system, including:
        one or more power sources;
        a power-distribution network, including a first portion connected to one or more of the power sources and a second portion connected to one or more of the power sources;
        one or more power loads connected to the first portion of the power-distribution network;

one or more power loads connected to the second portion of the power-distribution network;

power-supply controls configured to execute a control method including:

when the driving system is operating, operating in a first load-priority mode, including supplying power to the first and second portions of the power-distribution network with a priority on supplying power to the first portion of the power distribution network; and when the driving system is not operating, selectively operating in the first load-priority mode or a second load-priority mode dependent upon conditions of operation of the machine, wherein the second load-priority mode includes supplying power to the first and second portions of the power-distribution network with a priority on supplying power to the second portion of the power-distribution network.

17. The machine of claim 16, wherein the power loads connected to the first portion of the power-distribution network include at least one of a driving-system controller and a driving-system sensor.

18. The machine of claim 17, wherein operating in the first load-priority mode includes supplying power to the first portion of the power-distribution network independent of power demands of the power loads connected to the second portion of the power-distribution network.

19. The machine of claim 18, wherein the power loads connected to the second portion of the power-distribution network include one or more components of climate-conditioning units.

20. The machine of claim 16, wherein selectively operating in the first load-priority mode or the second load-priority mode dependent upon the conditions of operation of the machine includes:

during a power deficiency, repeatedly:

operating in the first load-priority mode until the satisfaction of a first predetermined condition; and subsequently, operating in the second load-priority mode until the satisfaction of a second predetermined condition.

21. The machine of claim 16, wherein:

the driving system is a drive train that includes a prime mover; and operating in the first load-priority mode when the driving system is operating includes operating in the first load-priority mode when the prime mover is operating.

22. The machine of claim 16, wherein the control method includes:

when the driving system is not operating and a power deficiency exists, supplying power to the first portion and the second portion of the power-distribution network with a priority on supplying power to the second portion of the power-distribution network until a predetermined condition is met.

23. The machine of claim 16, wherein:

the electrical system includes a power converter with an adjustable output voltage;

the power converter is connected between one or more of the power sources and the first portion of the power-distribution network; and operating in the first load-priority mode includes controlling the power converter to output power to the first portion of the power-distribution network at a substantially constant voltage.

* * * * *